US010942534B2

(12) United States Patent
Döner

(10) Patent No.: US 10,942,534 B2
(45) Date of Patent: Mar. 9, 2021

(54) METHOD, APPARATUS AND DEVICE FOR TRANSFERRING AND RECEIVING DATA SYMBOLS

(71) Applicant: Vestel Elektronik Sanayi ve Ticaret A.Ş., Manisa (TR)

(72) Inventor: Çağdaş Döner, Manisa (TR)

(73) Assignee: Vestel Elektronik Sanayi ve Ticaret A.S., Manisa (TR)

( * ) Notice: Subject to any disclaimer, the term of this patent is extended or adjusted under 35 U.S.C. 154(b) by 0 days.

(21) Appl. No.: 16/507,813

(22) Filed: Jul. 10, 2019

(65) Prior Publication Data

US 2020/0019197 A1 Jan. 16, 2020

(30) Foreign Application Priority Data

Jul. 10, 2018 (EP) .................... 18182633

(51) Int. Cl.
*G05D 22/02* (2006.01)
*G06F 40/126* (2020.01)
*F24F 11/00* (2018.01)
*H04L 12/28* (2006.01)
*H04L 29/06* (2006.01)

(52) U.S. Cl.
CPC .......... *G05D 22/02* (2013.01); *F24F 11/0008* (2013.01); *G06F 40/126* (2020.01); *H04L 12/2807* (2013.01); *H04L 12/2823* (2013.01); *H04L 63/08* (2013.01)

(58) Field of Classification Search
None
See application file for complete search history.

(56) References Cited

U.S. PATENT DOCUMENTS

| 6,850,252 | B1 | 2/2005 | Hoffberg |
| 2003/0109938 | A1 | 6/2003 | Daum et al. |
| 2003/0189040 | A1 | 10/2003 | Lee et al. |
| 2015/0276253 | A1 | 10/2015 | Montalvo |
| 2015/0326280 | A1 | 11/2015 | Patel et al. |
| 2018/0137858 | A1 | 5/2018 | Saxena et al. |

FOREIGN PATENT DOCUMENTS

CN 1980501 6/2007

*Primary Examiner* — Carlos R Ortiz Rodriguez
(74) *Attorney, Agent, or Firm* — Brandon V. Zuniga; James R. Gourley; Carstens & Cahoon, LLP

(57) ABSTRACT

To transfer data symbols to a device (10), the humidity in the vicinity of the device (10) is controllably altered. The humidity is set at a first level so as to represent a first symbol and the humidity is set at a second level so as to represent a second symbol which is different from the first symbol. The device (10) is able to measure the humidity in the vicinity of the device (10) to determine the level of humidity and thereby whether the first symbol or the second symbol is being transferred.

14 Claims, 3 Drawing Sheets

METHOD, APPARATUS AND DEVICE FOR TRANSFERRING AND RECEIVING DATA SYMBOLS

CROSS-REFERENCE TO RELATED APPLICATIONS

This application claims the benefit under 35 U.S.C. § 119(a) and 37 CFR § 1.55 to European patent application 18182633.0 filed Jul. 10, 2018, the entire content of which is incorporated herein by reference.

TECHNICAL FIELD

The present disclosure relates to a method and apparatus for transferring data symbols to a device and to a device arranged to receive data symbols.

BACKGROUND

There are many situations in which devices need to be able to transmit and/or receive data symbols. However, there are many devices that do not have a user interface such as a keyboard or touchscreen or the like by which data symbols may be entered. One known technique for inputting data symbols to such devices includes use of modulated light, which is detected by some light detector on the device and processed as necessary. However, use of modulated light may not always be possible or convenient.

SUMMARY

According to a first aspect disclosed herein, there is provided a method of transferring data symbols to a device, the method comprising:

controllably altering the humidity in the vicinity of the device, wherein the humidity is set at a first level so as to represent a first symbol and the humidity is set at a second level so as to represent a second symbol which is different from the first symbol, the device being able to measure the humidity in the vicinity of the device to determine the level of humidity and thereby whether the first symbol or the second symbol is being transferred.

This enables the data to be transferred to the device without requiring the data to be entered manually into the device (via a keyboard or touch screen or the like, which may not be present in the device). The method may be conveniently carried out using some household appliance, including for example a washing machine, a dishwasher, an air conditioner, an oven, etc. The humidity may be set at yet further different levels to transfer yet further different symbols.

Herein, reference is simply made to "humidity" and "level of humidity" and the like. This may be absolute humidity, that is the water content in the local environment (such as the water content of air in the local environment) expressed in for example grams per cubic meter or grams per kilogram. Alternatively, this may be relative humidity, which may be expressed as a percentage, which is a measure of the current absolute humidity relative to the maximum (saturated or highest point) humidity for the current temperature.

In an example, the method is carried out in a chamber in which the device is located.

The chamber may be provided by some appliance which is able to control the humidity within the appliance chamber. Suitable examples of such appliances include for example a dishwasher and an oven.

In an example, the method comprises measuring the humidity in the chamber to provide a feedback for the controlled altering of the humidity in the chamber.

A humidity sensor may be associated with the chamber. For example, if the chamber is a chamber of some appliance, the humidity sensor may be incorporated into the appliance.

In an example, the data symbols represent network credentials which enable the device to connect to a network.

In an example, the network credentials are converted to American Standard Code for Information Interchange ASCII or Unicode Transformation Format UTF format, which is then converted to binary format for transmission to the device, in which one of the first and second levels of humidity representing a digital 0 and the other of the first and second levels of humidity representing a digital 1.

According to a second aspect disclosed herein, there is provided apparatus for transferring data symbols to a device, the apparatus comprising:

a controller which is operable to cause the humidity in the vicinity of a said device to be controllably altered, wherein the controller is operable such that the humidity is set at a first level so as to represent a first symbol and the humidity is set at a second level so as to represent a second symbol which is different from the first symbol, whereby a said device is able to measure the humidity in the vicinity of the device to determine the level of humidity and thereby whether the first symbol or the second symbol is being transferred.

The apparatus may be or include for example a washing machine, a dishwasher, an air conditioner, an oven, etc.

In an example, the apparatus comprises a chamber in which a said device may be located.

The apparatus may be or include for example a dishwasher or an oven.

In an example, the apparatus comprises a humidity sensor for measuring the humidity in the vicinity of a said device and providing a feedback to the controller for the controlled altering of the humidity.

In an example, the apparatus comprises data storage in which the data symbols to be transferred are stored, the data symbols representing network credentials which enable a said device to connect to a network.

In an example, the apparatus comprises the controller is arranged to convert the network credentials to American Standard Code for Information Interchange ASCII or Unicode Transformation Format UTF format, the controller being arranged to convert the ASCII or UTF format to binary format for transmission to a said device, wherein one of the first and second levels of humidity represents a digital 0 and the other of the first and second levels of humidity represents a digital 1.

According to a third aspect disclosed herein, there is provided a device arranged to receive data symbols, the device comprising:

a humidity sensor for measuring the humidity in the vicinity of the device; and a processor for receiving a measure of the humidity in the vicinity of the device from the humidity sensor;

the processor being arranged to convert the received measure of the humidity to data symbols by identifying a first symbol with a first level of humidity and identifying a second symbol, which is different from the first symbol, with a second level of humidity, which is different from the first level of humidity.

In an example, the processor is arranged to interpret one of the first and second symbols as a digital 0 and the other of the first and second symbols as a digital 1.

In an example, the processor is arranged to convert received digital 0s and 1s to ASCII or UTF format.

In an example, the processor is arranged to use the received data symbols as network credentials to connect the device to a network.

BRIEF DESCRIPTION OF THE DRAWINGS

To assist understanding of the present disclosure and to show how embodiments may be put into effect, reference is made by way of example to the accompanying drawings in which.

DETAILED DESCRIPTION

Figure 1:
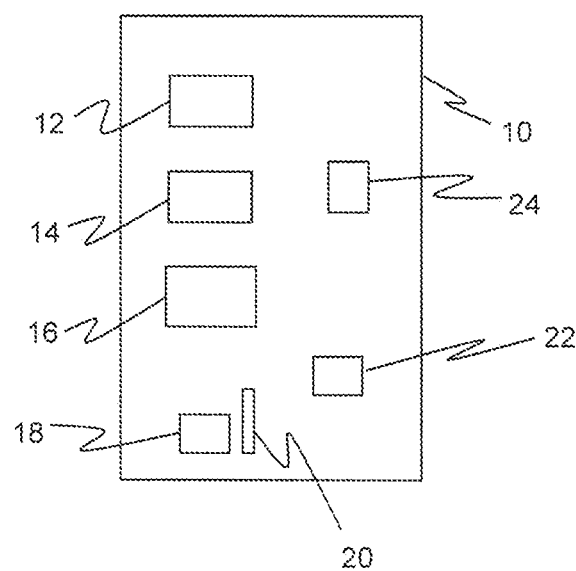
FIG. 1 shows schematically an example of a device arranged to receive data symbols.

As mentioned, there are many situations in which devices need to be able to transmit and/or receive data symbols. However, there are many devices that do not have a user interface such as a keyboard or touchscreen or the like by which data symbols may be entered, or it may not be convenient to use a keyboard or touchscreen or the like for some reason. Whilst various techniques for transferring data symbols to such devices are known, these are not always possible or convenient.

As a particular example, in order for a device to be able to connect to a network it is usually necessary for the device to provide network credentials to the network. In particular, a device needs to provide network credentials to a router or an access point or repeater or the like of the network so as to be able to sign in to the network. In the case of some devices, a user can simply input the network credentials or other data symbols to the device manually and directly, using for example a keyboard or touchscreen which is connected to or integrally provided as part of the device. However, this is not possible in the case that the device does not have a keyboard or touchscreen or the like, or it may not be convenient even if the device does have a keyboard or touchscreen or the like.

In overview, in examples described herein, data symbols are transferred to a device by controlling the humidity in the vicinity of the device. Different levels of humidity are detected by the device and interpreted as different data symbols. A first level of humidity may be interpreted as a first data symbol and a second level of humidity may be interpreted as a second data symbol. Further levels of humidity may be used to transfer further data symbols. This enables the data to be transferred to the device without requiring the data to be entered manually into the device (via a keyboard or touch screen or the like, which may not be present in the device). The method may be conveniently carried out using some household appliance, including for example a washing machine, a dishwasher, an air conditioner, an oven, etc. In general, a symbol can represent or convey one bit or several bits.

In a particular application, the device may be a so-called Internet of Things (IoT) device. In general, as used herein, an IoT device is a device that has an addressable interface (e.g. an Internet protocol (IP) address, a Bluetooth identifier (ID), a near-field communication (NFC) ID, etc.) and can transmit information to one or more other devices over a wired or wireless connection. IoT devices may in general include or be incorporated in for example sensors for sensing temperature or humidity or smoke or the like, refrigerators, ovens, microwaves, freezers, dishwashers, clothes washing machines, clothes dryers, furnaces, air conditioners, thermostats, televisions and other consumer electronic devices, light fixtures, vacuum cleaners, sprinklers, electricity meters, gas meters, etc.

IoT devices in particular often need to connect at least to a local network, which may for example be a local network in a building, such as a home or an office or factory, etc. The connection may be for example a WiFi or other wireless connection. Alternatively or additionally, IoT devices may need to connect to the Internet, so as to be able to report to or receive commands or data, etc., from some remote central database or controller or the like. In general, different devices, including IoT devices in particular, have a wide range of functionality, from for example very simple sensors that might report sensed temperatures periodically through to relatively complex devices with a high degree of functionality. For simple devices in particular, there is often no user interface as such, and therefore connecting the device to a network can require relatively complicated technical steps. Even if the device has a user interface that in principle enables a user to interact directly with the device, this can still be intimidating for users who may not be technically proficient.

Referring now to FIG. 1, this shows schematically an example of a device 10 arranged to receive data symbols. The device 10 has a processor 12, working memory (such as RAM or random access memory) 14 and data storage 16. The device 10 is also able to connect wirelessly to one or more networks, including for example a cellular network (such as 2G, 3G, 4G, etc.) and/or a WiFi or other local wireless network. The device 10 has one or more wireless connectivity modules 18 and one or more antennas 20 for this purpose. The device 10 has one or more power sources 22, which may be one or more batteries, which may be rechargeable or non-rechargeable and alternatively or additionally a connection to a mains electricity supply. The device 10 may be for example an IoT device.

In order for the device 10 to connect to a network, the device 10 requires network credentials. The precise network credentials and their format that are required will typically depend on the nature of the network and any accessibility requirements to allow a connection to the network to be made. As a generality, the network credentials will include some identifier of the network to which the device 10 will connect and some password or passphrase which is required in order for the connection to be authenticated. As a specific example, in the case of a wireless local area network (WLAN), for example based on IEEE 802.11 standards, network credentials will include an SSID (Service Set Identifier) and a password or passphrase. A service set identifier (SSID) is a sequence of characters that names a wireless local area network (WLAN).

For this purpose, the device 10 has at least one humidity sensor 24 which can detect different humidity levels in the vicinity of the device 10, i.e. in the immediate local environment of the device 10. Humidity sensors (or "hygrometers") are known in themselves and numerous different types of humidity sensor are available. For example, electronic humidity sensors are available in the form of integrated circuits which are small and require low power for operation and have a relatively high accuracy. Electronic humidity sensors may measure for example capacitive, resistive or thermal conductivity changes in order to provide a measure of the local humidity level. The output of the humidity sensor 24, that is the different humidity levels in the vicinity of the device 10 as sensed by humidity sensor 24, is passed to the processor 12 which interprets the different humidity levels as different symbols, as will be discussed further below. The output of the humidity sensor 24 may for example be at different voltages to convey respective different levels of humidity and therefore symbols to the processor 12 of the device 10.

In order to transfer or convey different symbols to the device 10, the humidity in the vicinity of the device 10 is controllably altered. For better accuracy and control, this may be carried out by placing the device 10 in a chamber in which the humidity can be controllably altered. The chamber is preferably closed when the humidity levels are being adjusted and being sensed by the device 10 to transfer data to the device 10.

The chamber may be part of a dedicated device or appliance provided for this specific purpose. Alternatively, and often more conveniently, the chamber may be provided by some other appliance which has some other principal purpose. For example, a number of domestic or household appliances (which may in practice be used in a home or household or in a work environment) may be used or adapted for this purpose. Moreover, many domestic or household appliances already connect to the Internet, via for example a WLAN. In the case that the device 10 requires network credentials to connect to a WLAN (i.e. the same WLAN here), this means that in many cases the domestic or household appliance already has stored therein the network credentials (such as an SSID and a password or passphrase) which are required by the device 10. Such network credentials will typically have been previously entered into the appliance by a user, either directly using some input device such as a keyboard or touchscreen or the like on the appliance or indirectly via some other input device, such as a smart phone or other computing device which is connectable via a wired or wireless connection to the appliance.

Some examples of suitable domestic or household appliances include washing machines, dishwashers, air conditioners, ovens and humidifiers. Some appliances already use water vapour or even steam as part of their normal operation, and may include a water vapour or steam generator for this purpose. As a particular example, some dishwashers use steam which is generated specifically for cleaning in some cleaning cycles or programmes. The steam may be generated by dedicated steam generators and is ejected through nozzles into the main chamber or compartment of the dishwasher. Alternatively, steam may be generated by electrical heaters that heat water contained in the bottom of the main chamber or compartment of the dishwasher. As another example, the internal cooking fan of an oven may be controlled so as to adjust the humidity within the oven chamber as required. In another example, an air conditioner may be controlled to as to control the indoor humidity in the vicinity of the device 10 as required. In another example, a humidifier may be controlled to as to control the indoor humidity in the vicinity of the device 10 as required.

Figure 2:
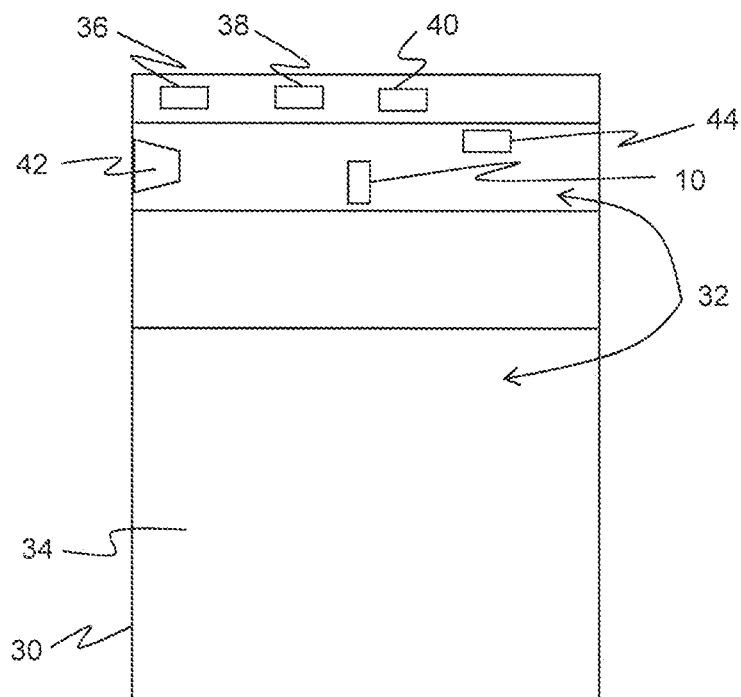
FIG. 2 shows schematically an example of apparatus for transferring data symbols to a device.

As a specific example, reference is made to FIG. 2 which shows schematically an example of apparatus 30 for transferring data symbols to the device 10. The apparatus 30 in this example is an appliance 30 which has at least one chamber 32 in which the device 10 may be placed and in which the humidity may be controlled. The appliance 30 is arranged so that the chamber 32 can be closed off from the environment and the rest of the appliance, which allows for better control of the humidity within the chamber 32.

In this specific example, the appliance 30 is a dishwasher 30. The dishwasher 30 has one or more chambers or compartments 32 into which dishes, cutlery, etc. are normally loaded for cleaning. The chamber 32 is divided into several sections, such as a lower main compartment 32 and at least one smaller, upper compartment 32. The dishwasher 30 has door 34 which can be opened and closed to allow access to the chamber 32 and to close off the chamber 32 from the exterior of the dishwasher 30. The dishwasher has a processor 36, working memory (such as RAM or random access memory) 38 and data storage 40. The processor 36 may operate in accordance with one or more computer programs stored in the data storage 40. Furthermore, in this example the dishwasher 30 has some arrangement for controllably producing steam. In this example, this is provided by a steam generator 42 which heats water and ejects steam into the chamber 32 when controlled as such by the processor 36. In other examples, the steam generator may be provided by some other arrangement, such as by an electrical heater which is located towards the bottom of the lower main compartment 32 to heat water that sits at the bottom of the lower main compartment 32. In this example, the dishwasher 30 has at least one humidity sensor 44 which can measure the humidity level within the chamber 32.

Figure 3:
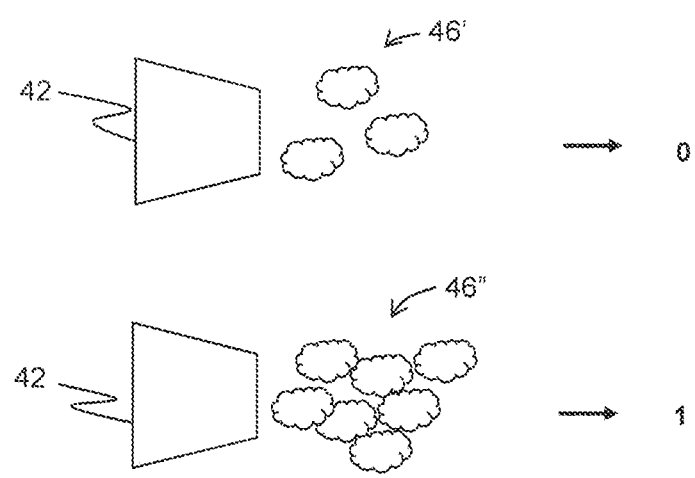
FIG. 3 shows schematically generation of low and high levels of humidity.

In the case that a device 10 needs to obtain data, the device 10 is loaded into the chamber 32 of the dishwasher 30. For example, the device 10 may be placed on an internal shelf of the dishwasher 30. In this example, the humidity sensor 44 of the dishwasher 30 is located within the same portion of the dishwasher 30 in which the device 10 is placed. The processor 36 of the dishwasher 30 is then operated so as to control the steam generator 42 to controllably set the humidity level within the chamber 32 as required. The In particular, in an example and referring to FIG. 3, in the case that a digital 0 is to be transferred to the device 10, the steam generator 42 is controlled by the dishwasher processor 36 to generate a relatively small amount of steam 46', so as to set the humidity level in the chamber 32 at a relatively low level. On the other hand, in the case that a digital 1 is to be transferred to the device 10, the steam generator 42 is controlled by the dishwasher processor 36 to generate a relatively large amount of steam 46", so as to set the humidity level in the chamber 32 at a relatively high level. The dishwasher processor 36 may use readings from the dishwasher humidity sensor 44 as a feedback arrangement when controlling the steam generator 42 to generate steam so that the desired humidity level in the chamber 32 can be set at the desired levels. It will be understood that in other examples a digital 1 may be conveyed by a low level of humidity and a digital 0 may be conveyed by a high level of humidity. Moreover, other symbols may be conveyed by further levels of humidity. In addition, the device 10 may be arranged to interpret the different levels of humidity as other symbols than simply a digital 0 or 1.

In an example, the device 10 is put into a data reception mode such that it operates to sense the surrounding humidity level via its humidity sensor 24 and processes the sensed humidity levels accordingly. For example, the device 10 may have a specific button that can be pressed or the device 10 may be responsive to shaking or vibration or the like in order to go into a data reception mode, etc. The device 10 may be put into the data reception mode by the user when for example the device 10 is loaded into the dishwasher 30.

Likewise, the dishwasher 30 or other appliance has an input that allows a user to put the appliance 30 into a data transmission mode in order to transfer the required data by controlling the humidity as necessary. This may be provided by for example a dedicated button or dial, etc. on the appliance 30. There may be a number of preset buttons or dial settings that, when operated, cause respective data to be transferred to the device 10.

Furthermore, the device 10 and the dishwasher 30 or other appliance may both initially be in a pre-configuration or calibration phase to allow the sensor 24 and processor 12 of the device 10 to be calibrated. For example, the dishwasher 30 may initially set a number of different known humidity levels which the device processor 12 also knows and which can be used to calibrate the device sensor 24 in an initial calibration phase.

The data to be transferred to the device 10 by the dishwasher 30 or other appliance will conveniently have been pre-stored in the data storage 40 of the dishwasher 30. Alternatively or additionally, the dishwasher 30 or other appliance may be arranged such that the data to be transferred to the device 10 is effectively entered into the dishwasher 30 "on-the-fly" in real time by a user.

In a particular example, the data to be transferred to the device 10 is or includes network credentials that will enable the device 10 to connect to a router or an access point or repeater or the like of a network and sign in to the network. Such network credentials may already have been stored in the data storage 40 of the dishwasher 30 or may be entered into the dishwasher 30 in real time by the user when the device 10 is about to be loaded or has been loaded into the dishwasher 30. In some cases, the dishwasher 30 itself will already be connected to a network or is capable of connecting to a network and so already has stored therein (for example in the data storage 40) the required network credentials that will enable the device 10 also to connect to the network. In the particular case of WLAN, the network credentials are an SSID and a password or passphrase.

In an example, the data to be transferred to the device 10 may be converted if necessary into ASCII (American Standard Code for Information Interchange) coded binary streams by the processor 36 of the dishwasher 30 or other appliance. For example, an "e" is encoded as "01100101". Following the example above, this means that to convey an "e" the humidity level within the appliance 30 is first set at a low level, then at a high level, and so on. In an alternative, UTF (Unicode Transformation Format) format may be used.

The adjustment of the humidity levels by the appliance 30 and the reading of the humidity levels by the device 10 may be coordinated on for example a time slot basis. That is, the humidity level may be set and maintained at a particular level for a certain, fixed period of time or time slot, which is known to the appliance 30 and the device 10, in order to convey one symbol or character. After that fixed period of time, the next symbol or character is conveyed by adjusting the humidity if required for the next time period if a different symbol is to be transferred, or leaving the humidity level the same for the next time period if the same symbol is to be transferred. It will be appreciated that the time periods should be such as to allow the appliance 30 to adjust the humidity level as required at any particular time. This is effectively an On-Off Key modulation technique which is used to encode data into humidity changes or different levels. There may be for example eight time slots from t0 to t7 in the timeslot structure which are used to represent 8 bits (1 byte) of data.

In some cases, the total time required to transmit particular data to the device 10 may be relatively long (perhaps many minutes or even a few hours). However, that is not normally likely to be a concern for the user: users are used to a dishwasher say being left on for relatively long periods of time, and the power consumption by the appliance for this data transfer purpose is likely to be relatively low. Moreover, in many cases, transferring data to the device 10 is likely to be a one-off event for the device 10 when first purchased or being installed say. The convenience to a user is considered to be of more importance than fast data transfer rates here: with appropriate set-up and arrangement of both the device 10 and the appliance 30, all the user needs to do is basically load the device 10 into the appliance 30 and operate a single button or the like on the appliance 30 in order to set up the device 10 with (in this example) the necessary network credentials. It will be understood that this can be less intimidating for users, especially users who may not be technically skilled, than having to access the device 10 and enter the details directly.

Figure 4:
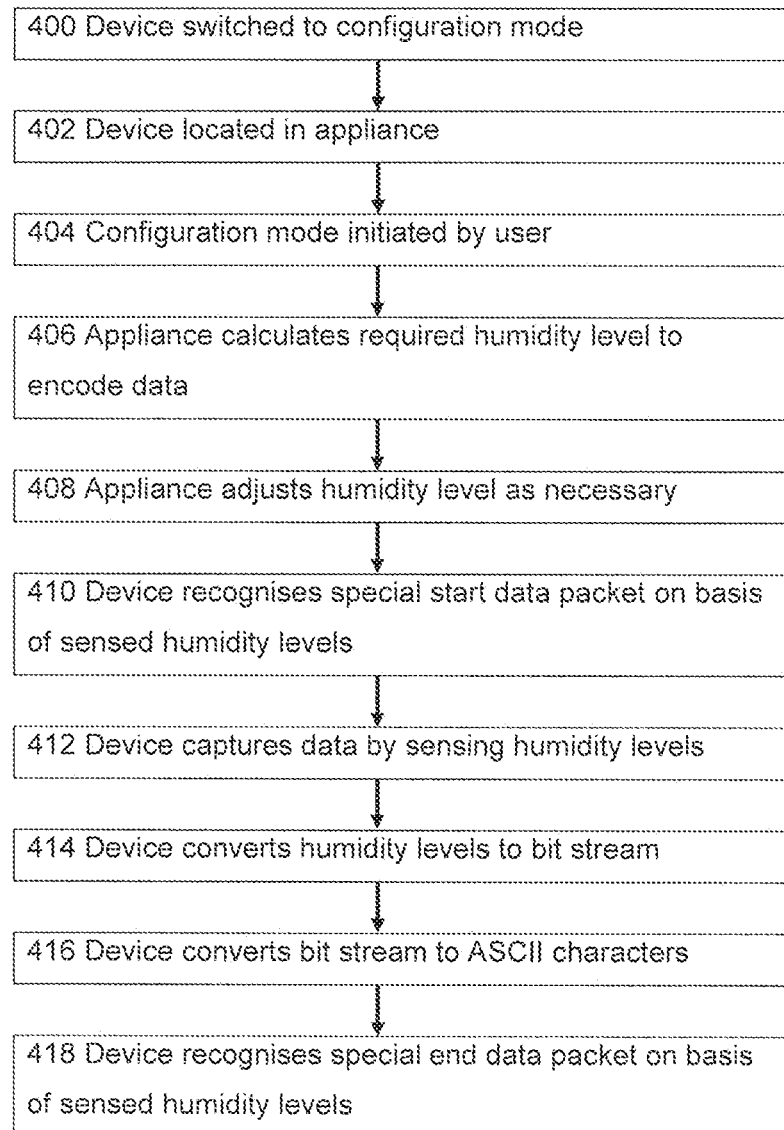
FIG. 4 shows schematically a flow diagram for an example of a method of transferring data symbols to a device.

Referring now to FIG. 4, this shows schematically a flow diagram for an example of a method of transferring data symbols to a device 10. At 400, the device 10 is switched to configuration mode. At 402, the device 10 is loaded into the appliance 30.

At 404, a configuration mode at the appliance 30 is initiated by the user. At 406, the appliance 30 calculates the required humidity levels to encode the data that is to be transmitted to the device 10. The appliance 30 adjusts the humidity levels as necessary as indicated at 408.

The appliance 30 and the device 10 may have stored therein details of a special data packet that is used to indicate the start of data transfer. In such a case, at 410 the appliance 30 has transmitted the start data packet and this is recognised by the device 10 on the basis of the sensed humidity levels.

At 412, the device 10 captures the necessary data by first sensing the humidity levels, which have been controlled as necessary by the appliance 30 as discussed above. At 414, the device 10 converts the sensed humidity levels to a bit stream in this example. The bit stream may then be converted by the device 10 to ASCII characters, as indicated at 416.

Finally, as all data has been transferred, in this example the appliance 30 adjusts the humidity levels as necessary to transmit a special end data packet. In such a case, at 418 the appliance 30 has transmitted the end data packet and this is recognised by the device 10 on the basis of the sensed humidity levels.

It will be understood that the processor or processing system or circuitry referred to herein may in practice be provided by a single chip or integrated circuit or plural chips or integrated circuits, optionally provided as a chipset, an application-specific integrated circuit (ASIC), field-programmable gate array (FPGA), digital signal processor (DSP), graphics processing units (GPUs), etc. The chip or chips may comprise circuitry (as well as possibly firmware) for embodying at least one or more of a data processor or processors and a digital signal processor or processors, which are configurable so as to operate in accordance with the exemplary embodiments. In this regard, the exemplary embodiments may be implemented at least in part by computer software stored in (non-transitory) memory and executable by the processor, or by hardware, or by a combination of tangibly stored software and hardware (and tangibly stored firmware).

Reference is made herein to data storage for storing data. This may be provided by a single device or by plural devices. Suitable devices include for example a hard disk and non-volatile semiconductor memory.

The examples described herein are to be understood as illustrative examples of embodiments of the invention. Further embodiments and examples are envisaged. Any feature described in relation to any one example or embodiment may be used alone or in combination with other features. In addition, any feature described in relation to any one example or embodiment may also be used in combination with one or more features of any other of the examples or embodiments, or any combination of any other of the examples or embodiments. Furthermore, equivalents and modifications not described herein may also be employed within the scope of the invention, which is defined in the claims.

The invention claimed is:

1. A method of transferring data symbols to a device, the method comprising:
controllably altering the humidity in the vicinity of the device to set the humidity at a first level or a second level which is different from the first level, wherein the humidity is set at the first level so as to represent a first symbol and the humidity is set at the second level so as to represent a second symbol which is different from the first symbol, the device being able to measure the humidity in the vicinity of the device to determine the level of the humidity in the vicinity of the device and thereby determine if the first symbol or the second symbol is being transferred.

2. A method according to claim 1, wherein the method is carried out in a chamber in which the device is located.

3. A method according to claim 2, comprising measuring the humidity in the chamber to provide a feedback for the controlled altering of the humidity in the chamber.

4. A method according to claim 1, wherein the data symbols represent network credentials which enable the device to connect to a network.

5. A method according to claim 4, wherein the network credentials are converted to American Standard Code for Information Interchange ASCII or Unicode Transformation Format UTF format, which is then converted to binary format for transmission to the device, in which one of the first and second levels of humidity representing a digital 0 and the other of the first and second levels of humidity representing a digital 1.

6. Apparatus for transferring data symbols to a device, the apparatus comprising:
a controller which is operable to cause the humidity in the vicinity of the device to be controllably altered to be set at a first level or a second level which is different from the first level, wherein the controller is operable such that the humidity is set at the first level so as to represent a first symbol and the humidity is set at the second level so as to represent a second symbol which is different from the first symbol, whereby the device is able to measure the humidity in the vicinity of the device to determine the level of the humidity in the vicinity of the device and thereby determine if the first symbol or the second symbol is being transferred.

7. Apparatus according to claim 6, the apparatus comprising a chamber in which the device may be located.

8. Apparatus according to claim 6, the apparatus comprising a humidity sensor for measuring the humidity in the vicinity of the device and providing a feedback to the controller for the controlled altering of the humidity.

9. Apparatus according to claim 6, the apparatus comprising data storage in which the data symbols to be transferred are stored, the data symbols representing network credentials which enable the device to connect to a network.

10. Apparatus according to claim 9, wherein the controller is arranged to convert the network credentials to American Standard Code for Information Interchange ASCII or Unicode Transformation Format UTF format, the controller being arranged to convert the ASCII or UTF format to binary format for transmission to the device, wherein one of the first and second levels of humidity represents a digital 0 and the other of the first and second levels of humidity represents a digital 1.

11. A device arranged to receive data symbols, the device comprising:
a humidity sensor for measuring the humidity in the vicinity of the device; and
a processor for receiving a measure of the humidity in the vicinity of the device from the humidity sensor;
the processor being arranged to convert the received measure of the humidity to data symbols by identifying a first symbol with a first level of humidity and identifying a second symbol, which is different from the first symbol, with a second level of humidity, which is different from the first level of humidity.

12. A device according to claim 11, wherein the processor is arranged to interpret one of the first and second symbols as a digital 0 and the other of the first and second symbols as a digital 1.

13. A device according to claim 12, wherein the processor is arranged to convert received digital 0s and 1s to ASCII or UTF format.

14. A device according to claim 11, wherein the processor is arranged to use the received data symbols as network credentials to connect the device to a network.

* * * * *